United States Patent
Panter (10) Patent No.: US 9,280,439 B2
(45) Date of Patent: Mar. 8, 2016

(54) USAGE ANALYSIS OF PRODUCTIVE ENVIRONMENT TO ESTABLISH NEW DATA SOURCE FOR PROCESS OPTIMIZATION AND PROJECT PLANNING

(75) Inventor: Bjoern Panter, Saabruecken (DE)

(73) Assignee: SAP SE, Walldorf (DE)

( * ) Notice: Subject to any disclaimer, the term of this patent is extended or adjusted under 35 U.S.C. 154(b) by 401 days.

(21) Appl. No.: 13/026,027

(22) Filed: Feb. 11, 2011

(65) Prior Publication Data

US 2012/0210307 A1 Aug. 16, 2012

(51) Int. Cl.
*G06F 9/45* (2006.01)
*G06F 11/34* (2006.01)

(52) U.S. Cl.
CPC ........ *G06F 11/3476* (2013.01); *G06F 11/3409* (2013.01); *G06F 11/3442* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 6,505,248 B1 * | 1/2003 | Casper et al. | 709/224 |
| 7,080,366 B2 * | 7/2006 | Kramskoy et al. | 717/148 |
| 7,389,494 B1 * | 6/2008 | Cantrill | 717/125 |
| 7,823,129 B2 * | 10/2010 | Dimpsey et al. | 717/124 |
| 8,156,474 B2 * | 4/2012 | Teplitsky et al. | 717/124 |
| 8,225,271 B2 * | 7/2012 | Eldridge et al. | 717/101 |
| 8,515,863 B1 * | 8/2013 | Morejon et al. | 705/38 |
| 8,528,000 B2 * | 9/2013 | Schumacher et al. | 718/106 |
| 2004/0006667 A1 * | 1/2004 | Bik et al. | 711/100 |
| 2005/0071515 A1 * | 3/2005 | DeWitt et al. | 710/1 |
| 2005/0071822 A1 * | 3/2005 | DeWitt et al. | 717/131 |
| 2005/0155019 A1 * | 7/2005 | Levine et al. | 717/127 |
| 2007/0226715 A1 * | 9/2007 | Kimura et al. | 717/148 |
| 2011/0016460 A1 * | 1/2011 | Archambault et al. | 717/158 |
| 2013/0006398 A1 * | 1/2013 | Mossner | 700/86 |

* cited by examiner

*Primary Examiner* — Evral E Bodden (74) *Attorney, Agent, or Firm* — Schwegman Lundberg & Woessner, P.A.

(57) ABSTRACT

Systems and methods to provide usage analysis of a productive environment are provided. In example embodiments, a logging module links to a compiler to obtain information on a program as the program is being executed by the compiler. One or more procedures of the program may be determined and a count for each of the one or more determined procedures maintained. The determined one or more procedures and the count for each of the one or more determined procedures are stored in a buffer as log data. The log data is compiled, using one or more processors, into a detailed data source for further analysis.

13 Claims, 7 Drawing Sheets

USAGE ANALYSIS OF PRODUCTIVE ENVIRONMENT TO ESTABLISH NEW DATA SOURCE FOR PROCESS OPTIMIZATION AND PROJECT PLANNING

FIELD

The present disclosure relates generally to data analysis, and in a specific example embodiment, to usage analysis of a productive environment to establish a new data source for process optimization and project planning.

BACKGROUND

Conventionally, systems exist that collect information about program usage. However, the information is not 100% correct or very detailed. For example, not all information related to specific techniques, programs batched in the background, programs with a submit statement, or transaction statements will be covered. Furthermore, conventional systems are not capable of determining function modules, methods, or classes that are called or identifying executed subroutines or dynamically called functionalities. Instead, conventional systems can only provide a high level view and are not able to catch any of the programming logic of the execution of the programming elements.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for providing usage analysis of a productive environment are provided. Example 1 is a method for facilitating usage analysis whereby a logging module links to a compiler to obtain information on a program as the program is being executed by the compiler. One or more procedures of the program may be determined and a count for each of the one or more determined procedures maintained. The determined one or more procedures and the count for each of the one or more determined procedures are stored in a buffer as log data. The log data is compiled, using one or more processors, into a detailed data source for further analysis.

In Example 2, the subject matter of Example 1 can optionally include retrieving the detailed data source at a manager system.

In Example 3, the subject matter of Examples 1-2 can optionally include providing access to the detailed data source at the manager system for performing the further analysis.

In Example 4, the subject matter of Examples 1-3 can optionally include storing the retrieved detailed data source in an info cube.

In Example 5, the subject matter of Examples 1-4 can optionally include wherein the one or more procedures comprises at least one of a subroutine, a function, a module, a method, or a class of the program.

In Example 6, the subject matter of Examples 1-5 can optionally include wherein the maintaining of the count comprises increasing the count for a particular procedure each instance the particular procedure is executed by the compiler.

In Example 7, the subject matter of Examples 1-6 can optionally include wherein the compiling of the log data comprises reading the data out of the buffer for a completed defined time period.

In Example 8, the subject matter of Examples 1-7 can optionally include wherein the reading occurs at a defined time period or when the buffer reaches a particular storage limit.

In Example 9, the subject matter of Examples 1-8 can optionally include enriching the read data with application server specific data.

In Example 10, the subject matter of Examples 1-9 can optionally include performing data comparison using the data source.

In Example 11, the subject matter of Examples 1-10 can optionally include presenting results of the data comparison in a graphical user interface. The graphical user interface is sortable to identify usage ranking of the procedures or features.

In Example 12, the subject matter of Examples 1-11 can optionally include using the data comparison to verify validity of a test case.

In Example 13, the subject matter of Examples 1-12 can optionally include using the data comparison to identify usage amount correlating one or more dates of usage for each procedure.

Example 14 is a system for facilitating usage analysis whereby a logging module links to a compiler to obtain information on a program as the program is being executed by the compiler. A determination module determines one or more procedures of the program and maintains a count for each of the one or more determined procedures. The determined one or more procedures and the count for each of the one or more procedures are stored in a buffer as log data. A job module compiles the log data into a detailed data source for further analysis.

In Example 15, the subject matter of Example 14 can optionally include an extraction module to trigger the retrieval of the detailed data source at a manager system In Example 16, the subject matter of Examples 14-15 can optionally include the determination module maintaining the count by increasing the count for a particular procedure each instance the particular procedure is executed by the compiler.

In Example 17, the subject matter of Examples 14-16 can optionally include the job module compiling the log data by reading the data out of the buffer for a completed defined time period.

In Example 18, the subject matter of Examples 14-17 can optionally include the job module further enriching the read data with application server specific data.

In Example 19, the subject matter of Examples 14-18 can optionally include an analysis engine to perform data comparison using the data source at a manager system.

Example 20 can include, or can optionally be combined with any of Examples 1-18 to include, a non-transitory machine-readable storage medium. The non-transitory machine-readable storage medium storing instructions which, when executed by at least one processor, performs operations to provide facilitate usage analysis. The operations include linking to a compiler to obtain information on a program as the program is being executed by the compiler, determining one or more procedures of the program, maintaining a count for each of the one or more determined procedures, storing the determined one or more procedures and the count for each of the one or more determined procedures in a buffer as log data, and compiling the log data into a detailed data source for further analysis.

Figure 1:
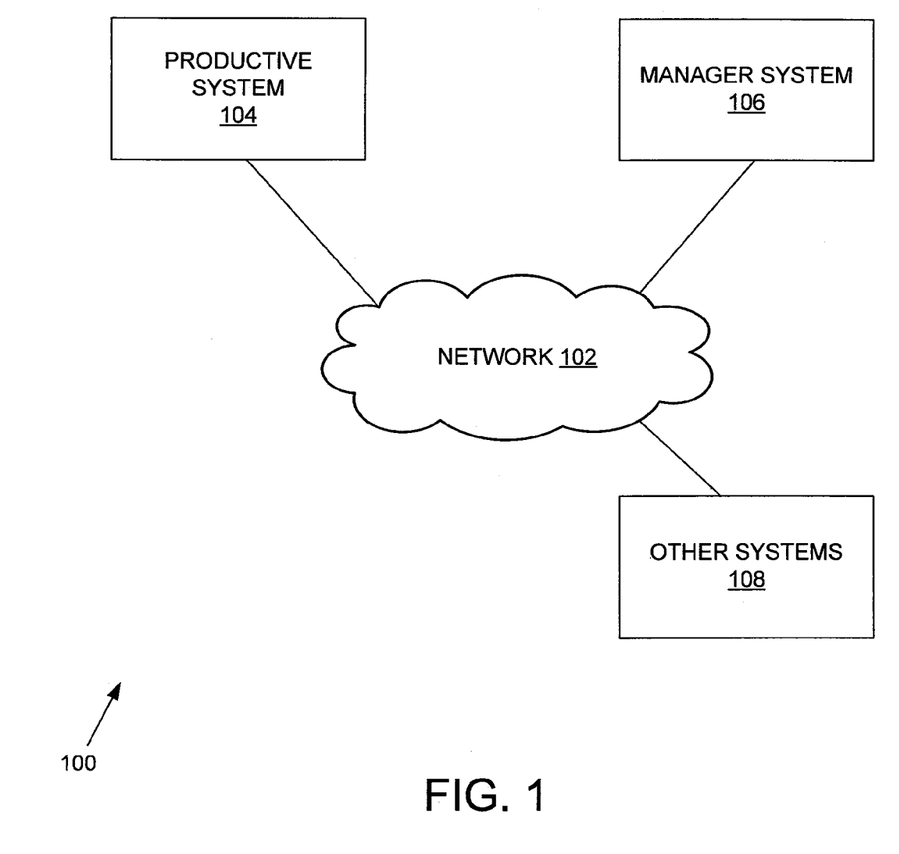
FIG. 1 illustrates an environment in which example embodiments of the inventive subject matter may be practiced.

With reference to FIG. 1, an environment 100 in which example embodiments of the inventive subject matter may be practiced is shown. The environment 100 comprises a network 102 that communicatively couples a productive system 104 to a manager system 106. Other systems 108 may also be communicatively coupled via the network 102 to the productive system 104 or the manager system 106. The network 102 may comprise, for example, one or more of a wired or wireless network, a local area network (LAN), or a wide area network (WAN). While the example embodiment of FIG. 1 shows the systems coupled via a network 102, alternative embodiments may contemplate the various systems (e.g., productive system 104, manager system 106, or other systems 108) being embodied within a single system (e.g., a single server system).

The productive system 104 is a system on which productivity software is running. For example, the productive system 104 may be an enterprise resource planning (ERP) system designed to support business processes such as managing sales orders, supplies, human resources, and financials. The productive system 104 may produce a large amount of data related to its operations. This data may be analyzed to determine type and amount of usage in order to optimize and plan future projects. More details of the analysis are provided below.

The manager system 106 may be a central platform for application management and collaboration. An example of the manager system is SAP Solution Manager. As such, the manager system 106 facilitates the collection, analysis, and sharing of data between the various systems of the environment 100. The manager system 106 will be discussed in further detail in connection with FIG. 3 below.

Figure 2:
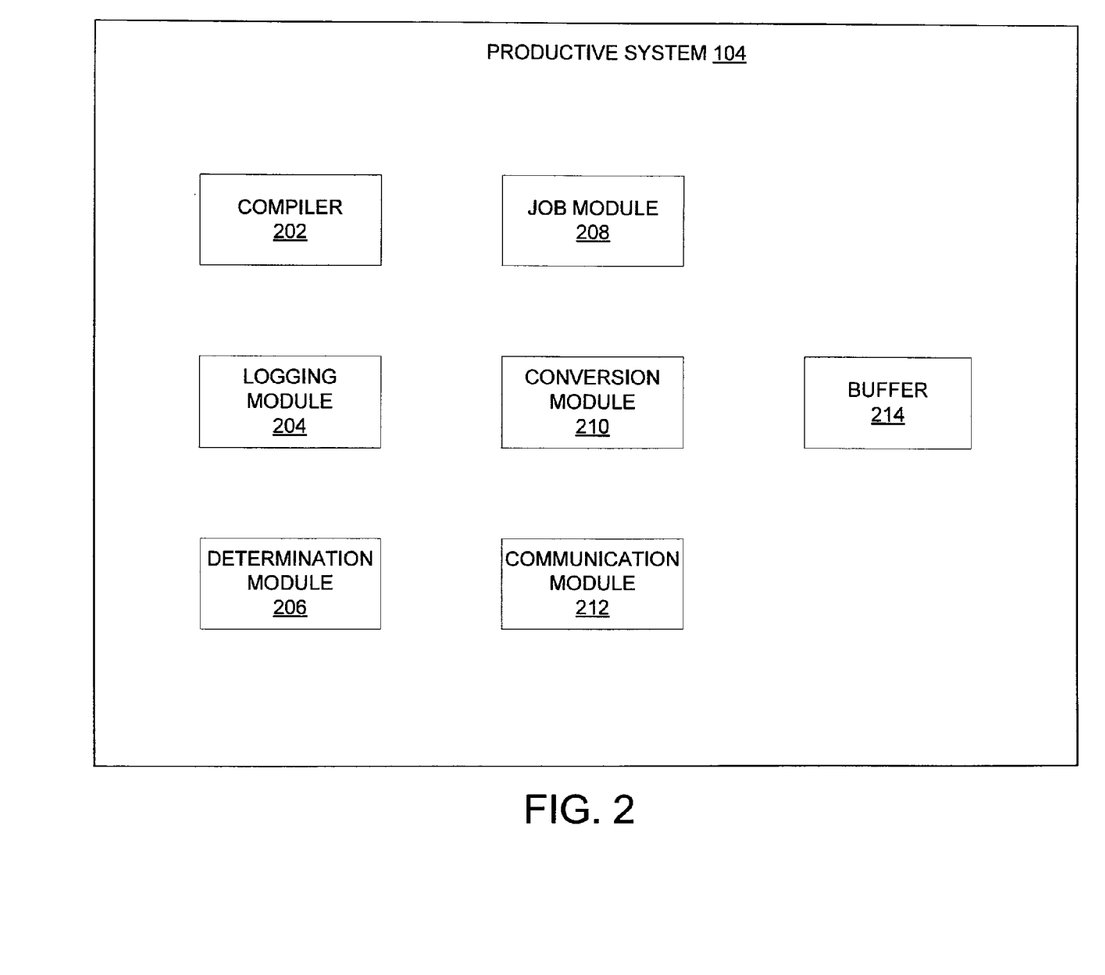
FIG. 2 is a block diagram illustrating a productive system.

FIG. 2 is a block diagram illustrating the productive system 104. The productive system comprises a compiler 202, a logging module 204, a determination module 206, a job module 208, a conversion module 210, a communication module 212, and a buffer 214. It should be noted that the productive system 104 comprises other components not shown that are not pertinent to execution of example embodiments of the inventive subject matter.

The compiler 202 transforms human readable source code of a program or application to be executed into machine readable code that one or more processors of the productive system 104 can then execute. In one embodiment, the compiler 202 may be an advanced business application programming (ABAP) compiler.

The logging module 204 collects data from the compiler 202 as the compiler 202 is compiling the program. As such, the logging module 204 is dynamically linked to the compiler 202. According to one embodiment, as the compiler 202 is loading the program into memory for execution, the logging module 204 links to the loading process to collect the data. Since the compiler 202 checks coding of the program to be executed, the logging module 204 can catch this environmental data.

The determination module 206 identifies procedures of the executing application. Procedures may include, but not be limited to, subroutines, functions, modules, methods, classes, and other programming elements. For example, the determination module 206 may identify subroutines of the program being executed. The determination may be performed on-the-fly using, for example, a program container comprising subroutine information. Using the program container, the corresponding subroutines in the program may be identified. The determination module 206 further performs a count of the procedure execution. Thus, for example, each time a particular procedure (e.g., subroutine) is executed, the determination module 206 will implement a counter increase for the particular subroutine. In one embodiment, the functionality of the determination module 206 may be combined with the logging module 204.

The job module 208 implements a periodic job which collects the buffered data in the shared memory by "cleaning" the buffered data and moving the data out of its own persistency on the productive system 104. In one embodiment, the job module 208 implements the periodic job based on a defined period. The defined period may indicate an amount of time (e.g., days) that the data will be saved on the productive system 104 before it is purged. For example, the defined period may be daily, and the job module 208 implements the periodic job every night at a predetermined time (e.g., 1 second after midnight). In an alternative embodiment, the job module 208 implements the periodic job when the shared memory reaches a particular level.

In one embodiment, the job module 208 reads the data out of UPL persistency from a previous completed period (e.g., the day before midnight). The results may then be enriched with application server specific data. This enriched data may be stored into a defined database table. As a result, the periodic job provides a complete list of every loaded and executed routine in detail over a particular time period.

The conversion module 210 converts the enriched data into a format that may be read by other systems. For example, the data may be converted into a format (e.g., BW reporting structure) to be sent to or retrieved by the manager system 106 via the communication module 212. In another example, the data may be converted into a format such that an external API may read the data from the productive system 104.

The data collected by the logging module 204 and identified by the determination module 206 is saved into a shared memory, such as the buffer 214. The saved data may be organized as a collection log. Other related information may also be stored in the shared memory such as a delete log (e.g., logging deletion of periodic jobs) and a read log (e.g., logging reads of periodic jobs).

Figure 3:
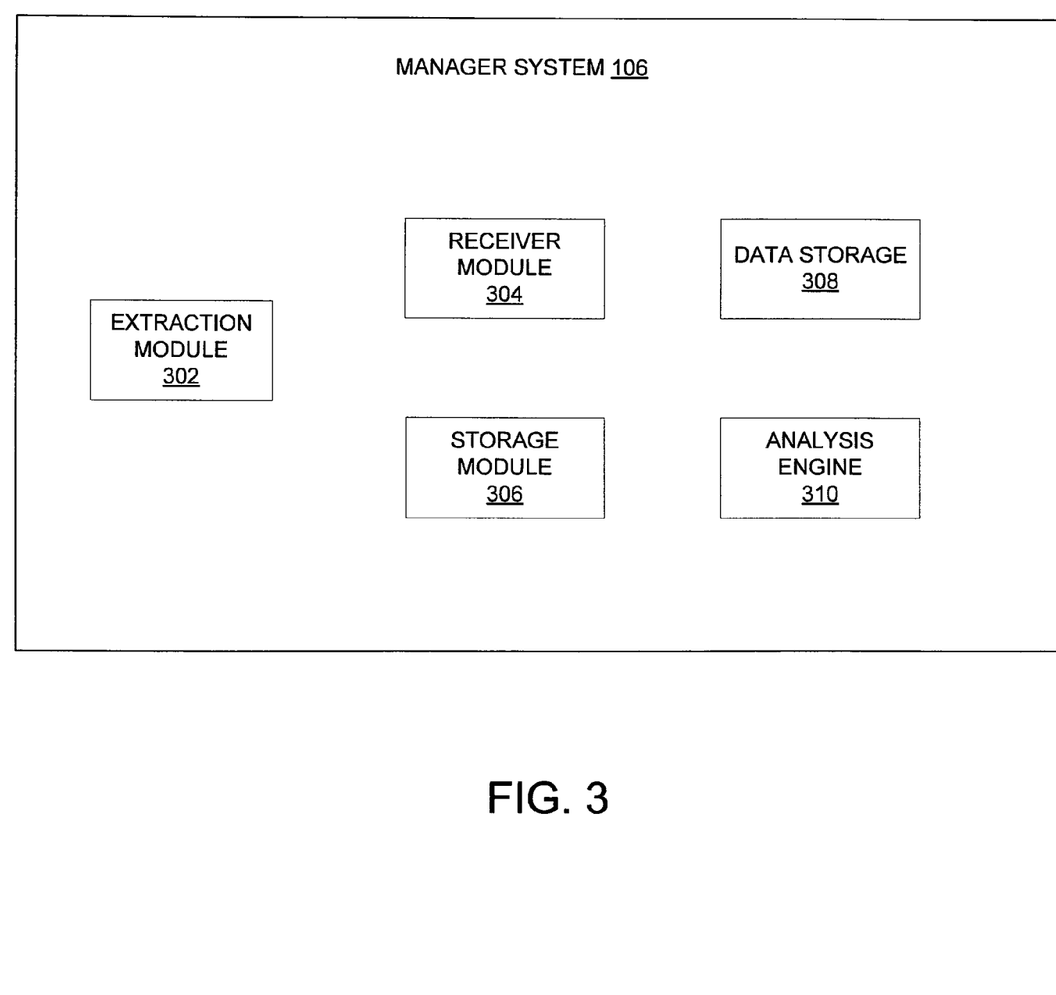
FIG. 3 is a block diagram illustrating a manager system.

FIG. 3 is a block diagram illustrating the manager system 106. In example embodiments, the manager system 106 comprises an extraction module 302, a receiver module 304, a storage module 306, data storage 308, and an analysis engine 310. It should be noted that the manager system 106 comprises other components (not shown) that are not pertinent to the operations of example embodiments.

The extraction module 302 triggers the collection of data at the productive system 104 and collects the data from the productive system 104. In example embodiments, the extraction module 302 checks for a periodic job at the productive system 104. If there are no current periodic jobs at the productive system 104, instructions sent from the extraction module 302 will trigger activation of the logging module 204. In one embodiment, the extraction module 302 collects the data and saves it into a FIFO database with a particular retention period. For example, if the retention period is 14 days and the define (job) period on the productive system 104 is daily (e.g., a job is initiated every night), then 14 time slices are obtained, which results in the ability to review data up to 14 days in the past. The retention period on the manager system 106 is definable.

The receiver module 304 retrieves data in the current periodic job from the productive system 104. In one embodiment, the receiver module 304 extracts the data from the productive system 104, compresses the data, and saves the data into its own database. For example, once the data is obtained by the receiver module 304, the storage module 306 fills the data storage 308 with the data forming a detailed data source at the manager system 106. The data source comprises, for example, information on the usage of executed subroutines, system information, and dates. In one embodiment, the data storage 308 comprises an info cube. The info cube is an object that can function as both a data target and an information provider.

The analysis engine 310 analyzes the data source in the data storage 308 for optimization and project planning purposes. For example, test evaluations, change impact analysis, and query analysis may be performed by the analysis engine 310 without having to access data stored at the productive system 104. Because the data is not accessed from the productive system 104, there is no impact on the operations or productivity of the productive system 104.

The analysis engine 310 may generate graphical user interfaces (GUI) that organize the data source according to a particular time slice (e.g., over a week, month, two months). In one embodiment, the GUI may be organized into a table whereby the columns indicate, for example, date of extraction, extraction time, program name, object type, object name, originator (e.g., developer of the source code), person responsible for source code, type (e.g., subroutine), name (e.g., of subroutine), and execution count for each subroutine.

The results on the GUI may be sorted. For example, if a user wants to know how many times a particular code is executed in a specific time frame, the user can sort using that parameter and see this feature ranked. Thus, for instance, the user can find out how many times a particular code is executed over a specific date range. The code may be custom code or generic code. As such, the user can find out what functionalities are really used in, for example, a customer's custom system.

The analysis engine 310 may comprise, or be coupled to, a tool (e.g., solution documentation system) that attempts to determine which business processes are used in the productive system 104. By integrating the data source with this solution documentation system, the execution of a specific subroutine may be linked to a particular business process. Consequently, the user can determine which business process is executed at which date. The results can be aggregated for any date range.

Furthermore, particular procedures (e.g., subroutines, programs, or business processes) may be identified as being executed on particular days. This information may be useful, for example, when upgrading a system. Typically, the system to be upgraded needs to be deactivated, the upgrades made, and the system restarted. Additionally, many programs will need to be regenerated. The results provided by the analysis engine 310 can identify which procedures are executed every day, for a specific day, or for a specific date. For example, a particular program may be executed every Monday. As such, if an upgrade is made and the system restarted on a Sunday, the program generation process can be improved because the user can focus on the relevant programs for a Monday.

Another tool coupled to or encompassed by the analysis engine 310 may be a product management tool to define new products. The product management tool may be used to determine usage for each or every customer. As such, the analysis engine 310 may extract data from the data source and filter the data by customer (e.g., based on installation number). By doing this, the product management tool can streamline a portfolio definition for further projects. For example, if it is determined that a lot of customers are working in the area of financials, efforts may be made to improve financial products while products in other areas may have less effort applied.

A further tool coupled to or encompassed by the analysis engine 310 may be a change impact analysis and test case scoping tool. This tool is able to track and create a logging for a test case. Behind the test case will be a'chain of programs. If the programs are validated with the content of the data source, a determination can be made if the test case is valid or not. This may indicate, for example, if a daily test case will cover a real productive day and show any gaps. If an element (e.g., subroutine) is not covered by a test case, the element is identified as a gap in the test case.

It should be noted that the data storage 308 and the analysis engine 310 may be located outside of the manager system 106 but coupled thereto. For example, the solution documentation system or the product management tool may be located on a separate system (e.g., server), and may access the data source stored in the data storage 308 via an external API.

Figure 4A:
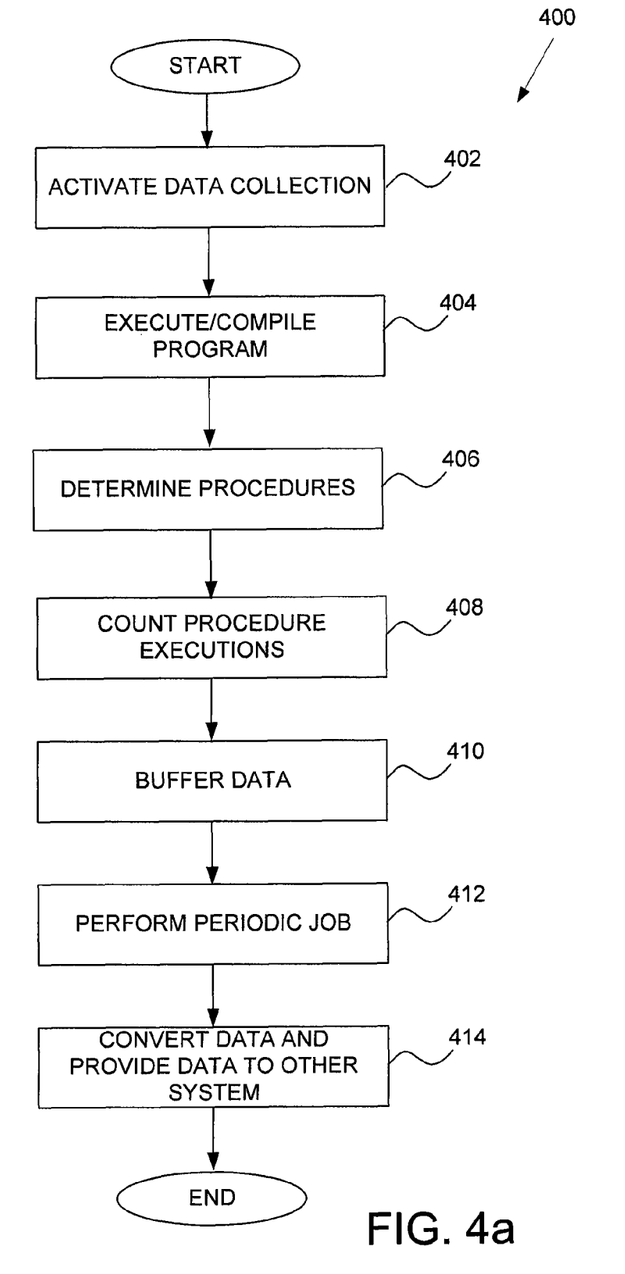
FIG. 4*a* is a flowchart of an example method to collect usage data at the productive system.

FIG. 4a is a flowchart of an example method 400 to collect usage data at the productive system 104. In operation 402, data logging at the productive system 104 is activated. In example embodiments, instructions are received from the extraction module 302 of the manager system 106, which will trigger the logging of data at the productive system 104.

In operation 404, a program is executed at the productive system 104. Thus, the compiler 202 transforms human readable source code of a program or application to be executed into machine readable code that one or more processors of the productive system 104 can then execute.

In operation 406, procedures are determined. In example embodiments, the logging module 204 collects data from the compiler 202 as the compiler 202 is compiling the program. The determination module 206 determines procedures of the executing application based on the collected data. For example, the determination module 206 may determine, on-the-fly, subroutines of the program being executed. The determination module 206 further performs a count of the procedure execution at operation 408. Thus, for example, each time a particular subroutine is executed, the determination module 206 will increase the count for the particular subroutine.

The collected and determined data (e.g., log data) are buffered in operation 410. In one embodiment, the log data is stored to a shared memory of the productive system 104.

In operation 412, periodic jobs are performed at a defined time or when the shared memory reaches a particular limit. The job module 208 implements the periodic job that collects the buffered data in the shared memory by "cleaning" the buffered data and moving the data into its own persistency on the productive system 104 to form a detailed data source at the productive system 104.

The conversion module 210 converts the data in the data source into a format that may be read by other systems in operation 414. For example, the data may be converted into a format to be sent to or retrieved by the manager system 106. In another example, the data may be converted into a format such that an external API may read the data from the productive system 104.

Figure 4B:
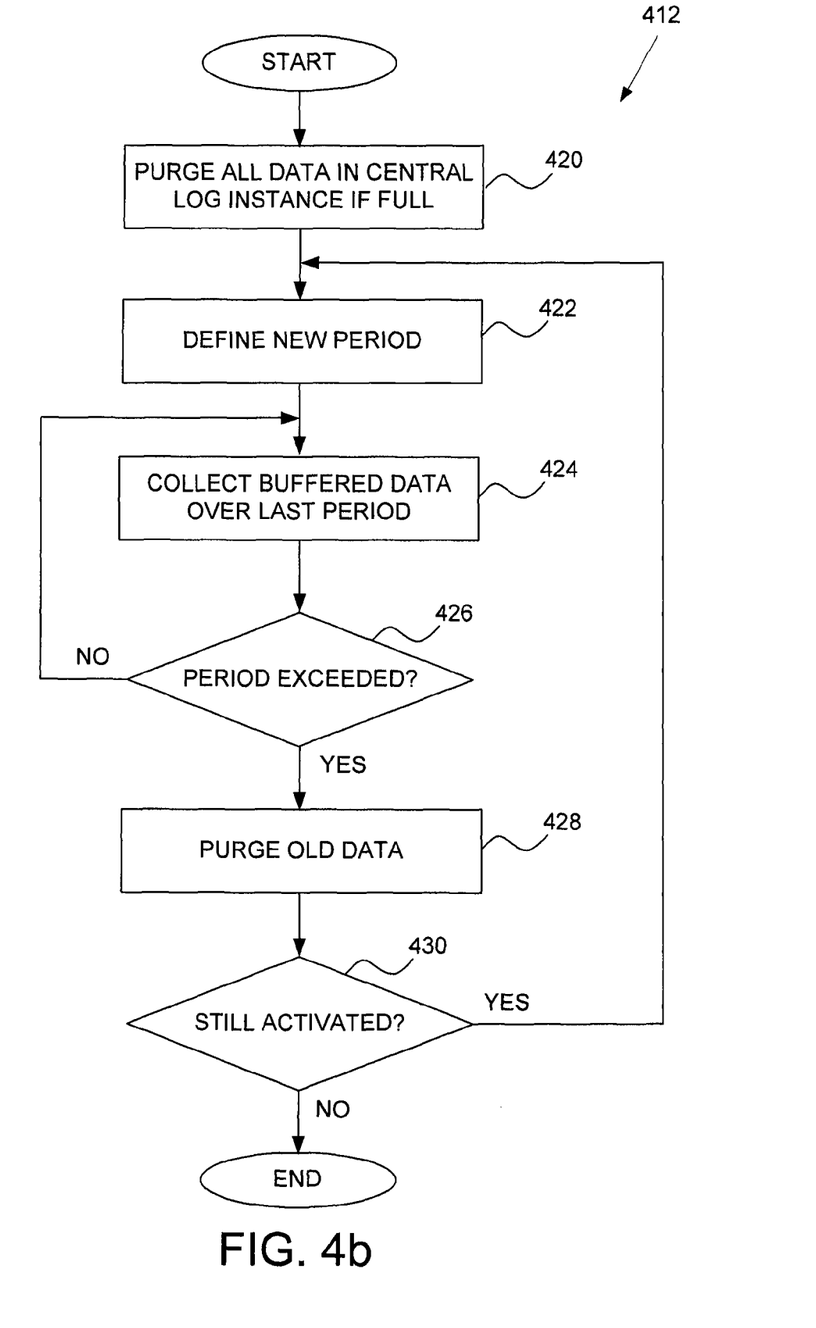
FIG. 4*b* is a flowchart of an example method to perform a periodic job.

FIG. 4b is a flowchart of an example method (operation 412) to perform a periodic job. At the start of the periodic job, if a central log instance is full, the data in the log may be purged in operation 420.

A new (job) period is defined in operation 422. The defined period is an amount of time the periodic job will cover. For example, the defined period may be one day. Operation 422 may be optional as a predefined period may stay enforced.

The buffered data is collected over a last defined period in operation 424. The data may be saved in a database table according to one embodiment. The saved data may include enriched data such as application server specific data.

A determination is made in operation 426 as to whether the defined period is exceeded. If the retention period is exceeded, then the old data may be purged in operation 428. However, if the defined period is not exceeded, then the job module 208 continues to collect data in operation 424.

Upon the purging of the old data in operation 428, a determination is performed in operation 430 as to whether the logging process is still activated. If the logging process is still active, then the job module 208 returns to operation 422 to define a new retention period.

Figure 5:
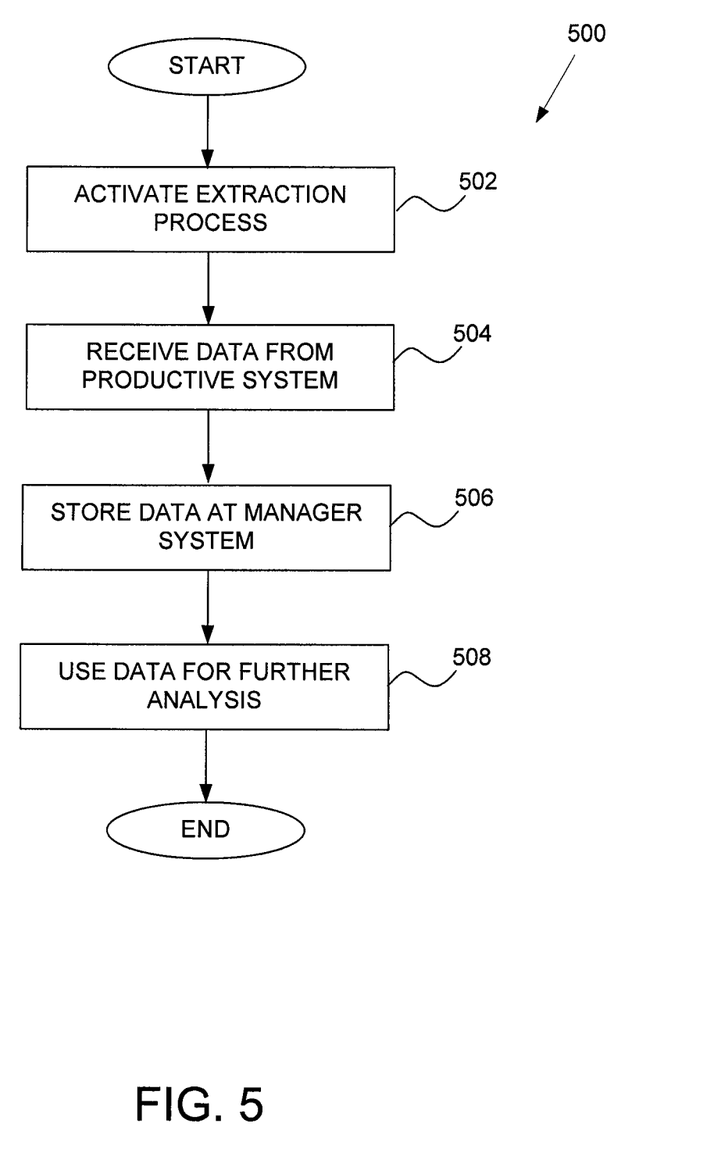
FIG. 5 is a flowchart of an example method to manage extracted data at the manager system.

FIG. 5 is a flowchart of an example method 500 to manage extracted data at the manager system 106. Initially, the extraction process is activated at operation 502. In example embodiments, the extraction module 302 triggers the logging of data at the productive system 104. Additionally, the extraction module 302 checks for a periodic job at the productive system 104. If there are no current periodic jobs at the productive system 104, instructions are sent from the extraction module 302 to trigger activation of the logging module 204.

In operation 504, data of a current periodic job is received from the productive system 104. Once the data is obtained by the receiver module 304, the storage module 306 fills the data storage 308 of the manager system 106 with the retrieved data to form a detailed data source at the manager system 106 in operation 506. The data comprises, for example, information on the usage of executed subroutines, system information, and dates.

The data source may then be used for further analysis in operation 508. The further analysis may be performed by the analysis engine 310 of the manager system 106 or by another tool or system accessing the stored data via an external API. For example, a user may determine which business process or element is executed on which date, and the results can be aggregated for any date range. In another example, the user may use the data source to determine usage trends for each or every customer.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 6:
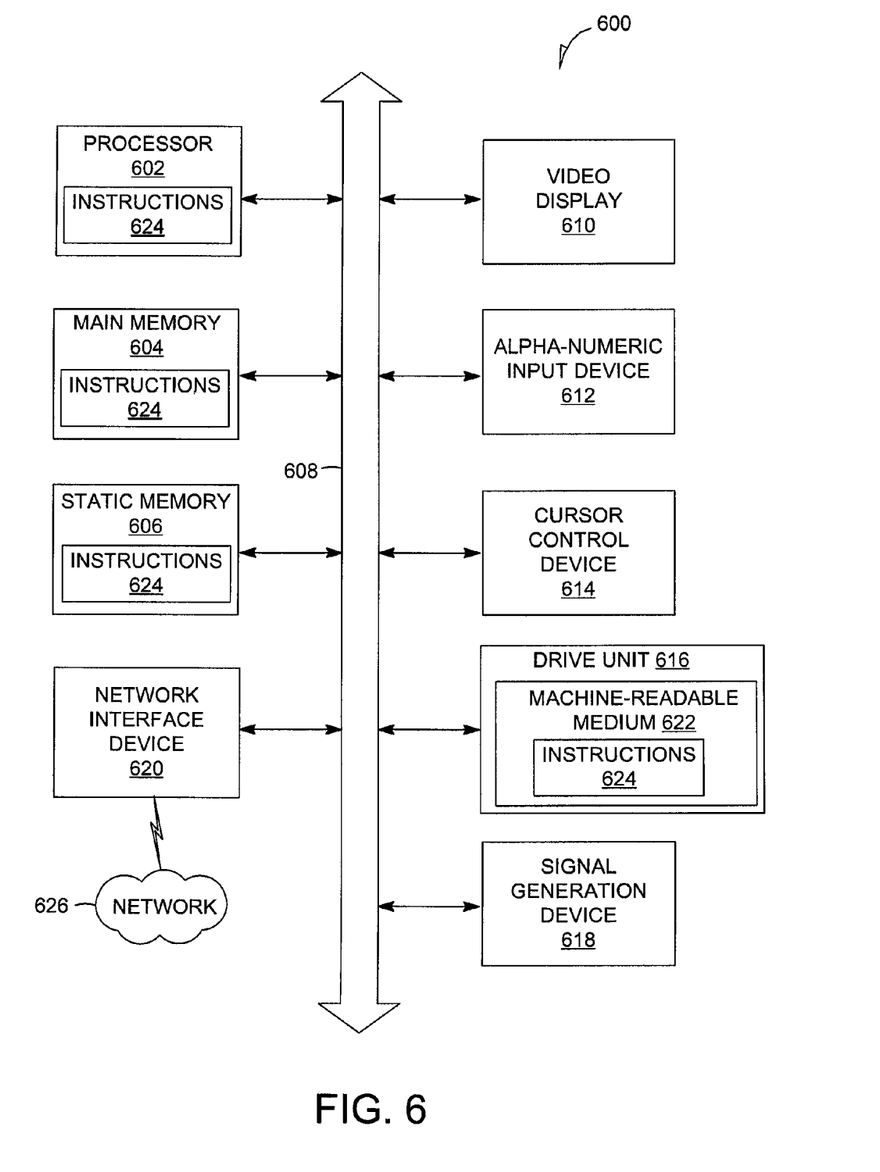
FIG. 6 is a simplified block diagram of a machine in an example form of a computing system within which a set of instructions for causing the machine to perform any one or more of the methodologies discussed herein may be executed.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alphanumeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable storage medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable storage medium 622 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories, optical and magnetic media, and non-transitory machine-readable storage media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   linking to a compiler to obtain information on a program from the compiler, the program having one or more procedures, as the program is being loaded into memory for compiling by the compiler;
   determining the one or more procedures of the program using the information obtained about the program as the program is being loaded into memory for compiling by the compiler, the information including a program container comprising subroutine information;
   maintaining a count for each of the one or more determined procedures, the maintaining of the count comprising increasing the count for a particular procedure each instance the particular procedure is executed by the compiler;
   storing the determined one or more procedures and the count for each of the one or more determined procedures in a buffer as log data;

after a first predetermined time period, storing the log data from the first predetermined time period, including information regarding each and every execution of the each of the one or more determined procedures, as a first time slice in a defined database table;

analyzing log data pertaining to the one or more determined procedures from a plurality of different time slices, including the first time slice, in the defined database table;

enriching the log data with application server specific data;

performing data comparison using the log data; and presenting results of the data comparison in a graphical user interface, the graphical user interface being sortable to identify usage ranking of the procedures or features.

2. The method of claim 1, further comprising retrieving the defined database table at a manager system.

3. The method of claim 2, further comprising providing access to the defined database table at the manager system for performing the further analysis.

4. The method of claim 2, further comprising storing the retrieved defined database table into an info cube.

5. The method of claim 1, wherein the one or more procedures comprises at least one of a subroutine, a function, a module, a method, or a class of the program.

6. The method of claim 1, further comprising, after the first predetermined time period, performing the linking, determining, maintaining, and storing again, and then, after a second predetermined time period, storing the log data from the second predetermined time period as a second time slice in a defined database table.

7. The method of claim 1, further comprising performing data comparison using the log data.

8. The method of claim 7, further comprising using the data comparison to verify validity of a test case.

9. The method of claim 7, further comprising using the data comparison to identify usage amount correlating one or more dates of usage for each procedure.

10. A system comprising:
a processor;
a plurality of modules executable by the processor, the plurality of modules including:
a software logging module configured to link to a compiler to obtain information on a program from the compiler as the program is being loaded into memory for compiling by the compiler, the program having one or more procedures;
a software determination module configured to determine the one or more procedures of the program using the information obtained about the program as the program is being loaded into memory for compiling by the compiler, the information including a program container comprising subroutine information, and to maintain a count for each of the one or more determined procedures, the determined one or more procedures and the count for each of the one or more determined procedures being stored in a buffer as log data in a computer readable medium, the maintaining of the count comprising increasing the count for a particular procedure each instance the particular procedure is executed by the compiler; and a software job module configured to, after a first predetermined time period, store the log data from the first predetermined time period, including information regarding each and every execution of the each of the one or more determined procedures, as a first time slice in a defined database table in a computer readable medium, enrich the log data with application server specific data, perform data comparison using the log data, and present results of the data comparison in a graphical user interface, the graphical user interface being sortable to identify usage ranking of the procedures or features.

11. The system of claim 10, further comprising an extraction module configured to trigger the retrieval of the defined database table at a manager system.

12. The system of claim 10, further comprising an analysis engine configured to perform data comparison using the defined database table data source at a manager system.

13. A non-transitory machine-readable storage medium in communication with at least one processor, the machine-readable storage medium storing instructions which, when executed by the at least one processor, performs operations comprising:

linking to a compiler to obtain information on a program from the compiler, the program having one or more procedures, as the program is being loaded into memory for compiling by the compiler;

determining the one or more procedures of the program using the information obtained about the program as the program is being loaded into memory for compiling by the compiler, the information including a program container comprising subroutine information;

maintaining a count for each of the one or more determined procedures, the maintaining of the count comprising increasing the count for a particular procedure each instance the particular procedure is executed by the compiler;

storing the determined one or more procedures and the count for each of the one or more determined procedures in a buffer as log data;

after a first predetermined time period, storing the log data from the first predetermined time period, including information regarding each and every execution of the each of the one or more determined procedures, as a first time slice in a defined database table;

analyzing log data pertaining to the one or more determined procedures from a plurality of different time slices, including the first time slice, in the defined database table;

enriching the log data with application server specific data;

performing data comparison using the log data; and presenting results of the data comparison in a graphical user interface, the graphical user interface being sortable to identify usage ranking of the procedures or features.

* * * * *